United States Patent
Takeuchi et al.

(10) Patent No.: US 8,091,428 B2
(45) Date of Patent: Jan. 10, 2012

(54) ULTRASONIC PROBE AND ULTRASONIC DIAGNOSTIC APPARATUS

(75) Inventors: Takashi Takeuchi, Otawara (JP); Yasuo Miyajima, Utsunomiya (JP); Takashi Ogawa, Nasushiobara (JP)

(73) Assignees: Kabushiki Kaisha Toshiba, Tokyo (JP); Toshiba Medical Systems Corporation, Otawara-shi (JP)

( * ) Notice: Subject to any disclaimer, the term of this patent is extended or adjusted under 35 U.S.C. 154(b) by 530 days.

(21) Appl. No.: 12/240,232

(22) Filed: Sep. 29, 2008

(65) Prior Publication Data

US 2009/0093722 A1   Apr. 9, 2009

(30) Foreign Application Priority Data

Oct. 3, 2007   (JP) ................. 2007-260320

(51) Int. Cl.
*G01N 9/18* (2006.01)
*A61B 8/14* (2006.01)
(52) U.S. Cl. .............. 73/661; 73/649; 600/459
(58) Field of Classification Search .......... 73/661, 73/649, 658; 600/447, 459; 310/334–337
See application file for complete search history.

(56) References Cited

U.S. PATENT DOCUMENTS

| | | | | |
|---|---|---|---|---|
| 5,886,454 A * | 3/1999 | Ito et al. | ......... | 310/322 |
| 6,341,408 B2 * | 1/2002 | Bureau et al. | ......... | 29/25.35 |
| 6,415,485 B1 * | 7/2002 | Hanafy | ......... | 29/25.35 |
| 7,090,643 B2 * | 8/2006 | Fidel et al. | ......... | 600/447 |
| 7,348,713 B2 * | 3/2008 | Hashimoto | ......... | 310/334 |
| 2008/0045838 A1 * | 2/2008 | Hyuga | ......... | 600/463 |

FOREIGN PATENT DOCUMENTS

| | | |
|---|---|---|
| CN | 1481759 A | 3/2004 |
| JP | 7-303300 | 11/1995 |
| JP | 2003-9288 | 1/2003 |
| JP | 2004-41730 | 2/2004 |
| JP | 2004-251658 | 9/2004 |
| JP | 2005245771 | * 9/2011 |
| KR | 2002-0070868 | 9/2002 |
| KR | 10-2006-0124601 | 12/2006 |

OTHER PUBLICATIONS

Office Action issued May 18, 2011 in China Application No. 200810168985.3 (With English Translation).
Korean Office Action mailed on Aug. 2, 2011 issued for Korean Application No. 2008-93608 (with English Translation).

* cited by examiner

*Primary Examiner* — J M Saint Surin
(74) *Attorney, Agent, or Firm* — Oblon, Spivak, McClelland, Maier & Neustadt, L.L.P.

(57) ABSTRACT

An ultrasonic probe has a plurality of modules joined at least along the elevation direction. The module has a plurality of first piezoelectric transducers having a first width with respect to the elevation direction. The module has at least one second piezoelectric transducer having a second width narrower than the first width with respect to the elevation direction. The second piezoelectric transducer is arranged at the module ends with respect to the elevation direction. The module is arranged in such a manner that the second piezoelectric transducer faces the second piezoelectric transducer of the adjacent module.

7 Claims, 8 Drawing Sheets

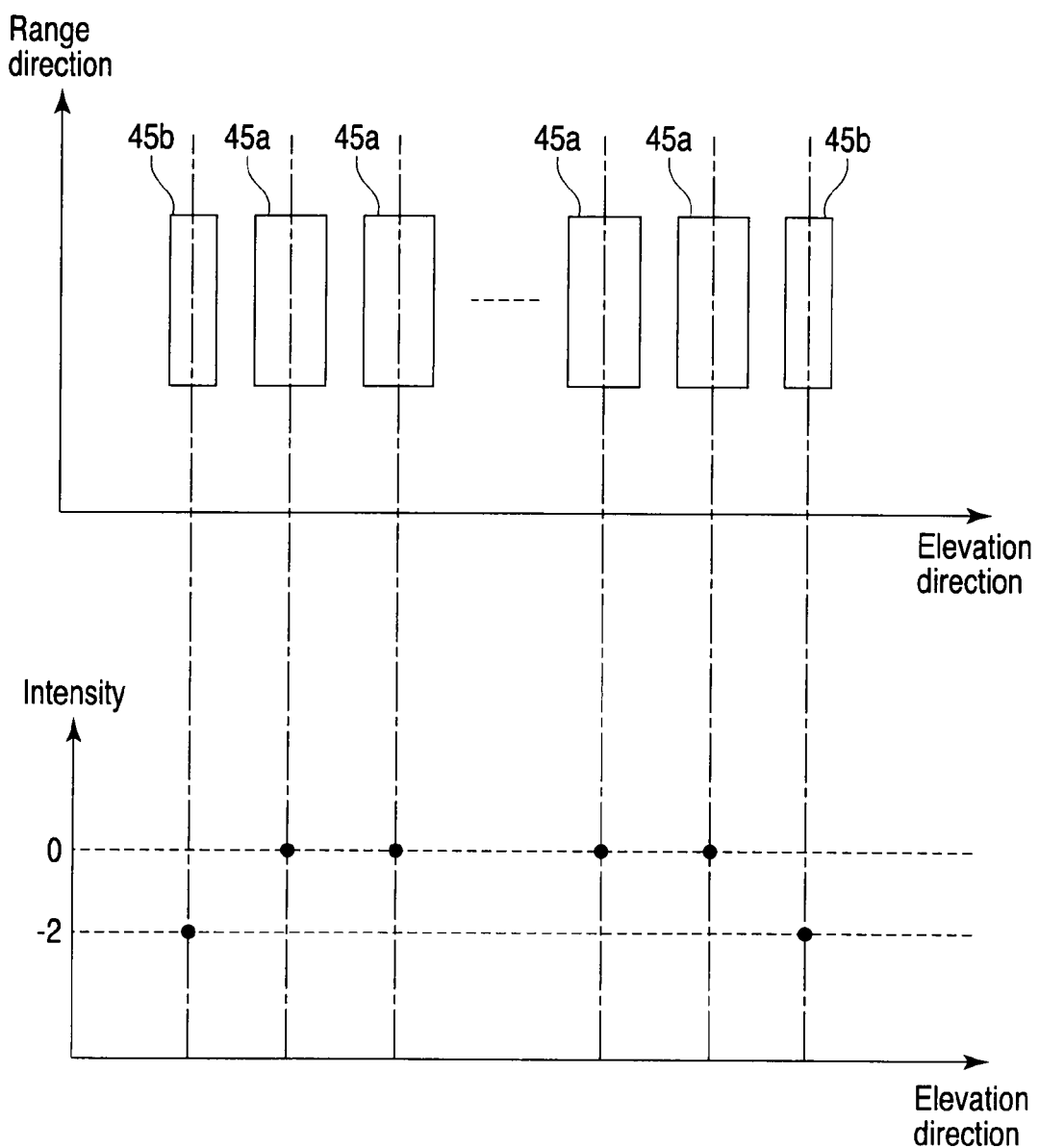
F I G. 5

ULTRASONIC PROBE AND ULTRASONIC DIAGNOSTIC APPARATUS

CROSS-REFERENCE TO RELATED APPLICATIONS

This application is based upon and claims the benefit of priority from prior Japanese Patent Application No. 2007-260320, filed Oct. 3, 2007, the entire contents of which are incorporated herein by reference.

BACKGROUND OF THE INVENTION

1. Field of the Invention

The present invention relates to an ultrasonic probe having a plurality of modules, and an ultrasonic diagnostic apparatus.

2. Description of the Related Art

There is an ultrasonic probe which has a plurality of piezoelectric transducers. As applied examples of this ultrasonic probe, there is an ultrasonic probe with two or more modules connected in at least one direction (see, for example, Jpn. Pat. Appln. KOKAI Publication No. 2004-41730).

FIG. 8 shows a transverse cross sectional view of an ultrasonic probe 100 including a plurality of modules 90. The ultrasonic probe 100 has two modules 90. The module 90 has a backing material 91. To the upper of the backing material 91, a plurality of piezoelectric transducers 95 are disposed via a flexible PC board (FPC) 93 having a thickness of W90 (typically 50 μm). The module 90 has 12 piezoelectric transducers 95 along a first direction. Typically, the width W91 along the first direction of the piezoelectric transducer 95 is 250 μm. In addition, the width W93 of a groove between the piezoelectric transducers 95 by dicing is typically 50 μm. Consequently, the center-to-center distance p90 of two adjacent piezoelectric transducers 95b inside the module 90 is 300 μm.

The modules 90 are connected in the first direction by silicone adhesives, etc. and the thickness W96 of an adhesive layer 96 is typically 50 μm. In order to connect the modules 90, or in order to allow the FPC 93 to pass through between surfaces to be connected, the center-to-center distance p91 of two piezoelectric transducers 95a to be connected becomes 400 μm. That is, the distance p91 is wider than the distance p90. As a result, side lobes rise.

In a module of this kind of configuration, sub-dicing is sometimes performed for piezoelectric transducers in order to suppress unrequired vibrations. In this event, assume that part of the piezoelectric transducer 95b which is divided by sub-dicing and has the width W97 is called a piezoelectric transducer piece 95c. The width W98 of a groove generated by sub-dicing is typically 50 μm. Consequently, the width W97 of the piezoelectric transducer piece 95c is 100 μm, and therefore, the effective width W99 (W99=2×W97) of the piezoelectric transducer piece 95c inside the module 90 becomes 200 μm.

As shown in FIG. 8, even if sub-dicing is performed on the piezoelectric transducer 95b, only the piezoelectric transducer 95a at an ends of the module 90 is not sub-diced in order to secure mechanical strength. However, in such event, the width W91 of the piezoelectric transducer 95a is 50 μm wider than the effective width W99 of the piezoelectric transducer 95b. Consequently, applying the same drive voltage to the piezoelectric transducer 95a and the piezoelectric transducer 95b increases the intensity of ultrasonic wave generated from the piezoelectric transducer 95a by about 2 dB from the intensity of ultrasonic wave generated from the piezoelectric transducer 95b. This results in inverse-weighting acoustic distribution and increases side lobes further.

BRIEF SUMMARY OF THE INVENTION

It is an object of the present invention to enable reduction of side lobe increase in an ultrasonic probe including a plurality of modules and an ultrasonic diagnostic apparatus.

According to a first aspect of the present invention, there is provided an ultrasonic probe comprising: a plurality of modules joined along at least in one direction, wherein each of said modules includes: a plurality of first transducers having a first width with respect to the first direction; and at least one second transducer having a second width narrower than the first width with respect to the first direction, and arranged at both ends or one end of the modules with respect to the first direction.

According to a second aspect of the present invention, there is provided an ultrasonic probe comprising: a plurality of first transducers having a first width with respect to a first direction and arranged two-dimensionally along the first direction as well as along a second direction that intersects with the first direction; and a plurality of second transducers having a second width narrower than the first width with respect to the first direction and arranged two-dimensionally along the first direction as well as along the second direction, wherein said plurality of first transducers and said plurality of second transducers are alternately arranged at least along the first direction.

According to a third aspect of the present invention, there is provided an ultrasonic diagnostic apparatus comprising: an ultrasonic probe having a plurality of modules joined at least along a first direction, wherein each of said modules includes: a plurality of first transducers having a first width with respect to the first direction; and at least one second transducer having a second width narrower than the first width with respect to the first direction, and arranged at both ends or one end of the modules with respect to the first direction.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram showing difference in ultrasonic intensity generated from each piezoelectric transducer of FIG. 3;

DETAILED DESCRIPTION OF THE INVENTION

Figure 1:
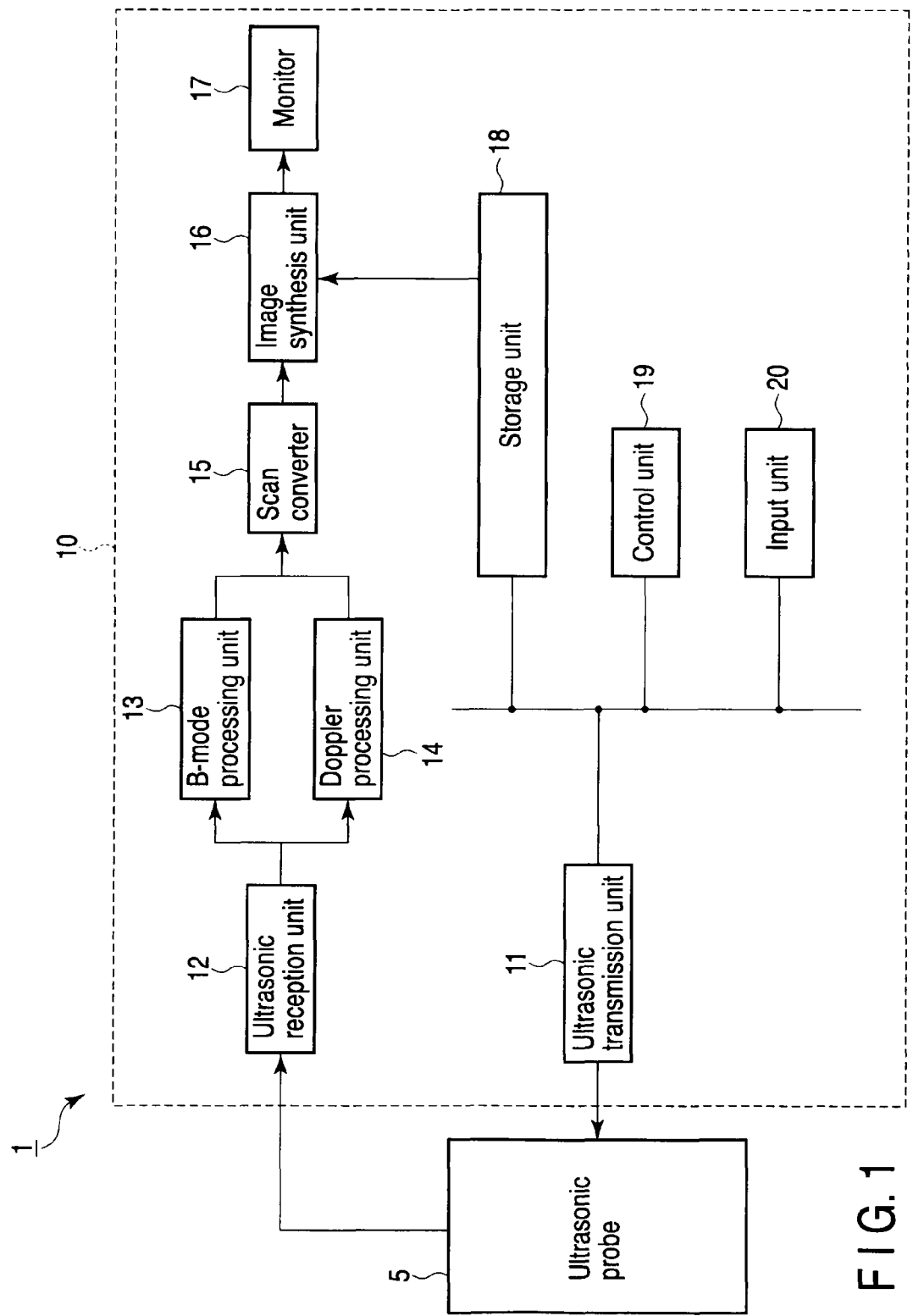
FIG. 1 is a block diagram showing a configuration of an ultrasonic diagnostic apparatus according to an embodiment of the present invention.

Referring now to the drawings, embodiments of the present invention will be described in detail as follows.

FIG. 1 is a block diagram showing configuration of an ultrasonic probe and an ultrasonic diagnostic apparatus according to the present embodiment. As shown in FIG. 1, the ultrasonic diagnostic apparatus 1 includes an ultrasonic probe 5 and an ultrasonic diagnostic apparatus body 10.

The ultrasonic probe 5 is connected to the ultrasonic diagnostic apparatus body 10. The ultrasonic probe 5 receives ultrasonic drive pulses from the ultrasonic diagnostic apparatus body 10 and generates ultrasonic waves, and receives ultrasonic waves reflected by a patient. The ultrasonic probe 5 converts the received ultrasonic waves into echo signals and transmits them to the ultrasonic diagnostic apparatus body 10. The ultrasonic probe 5 has a structure unique to the present embodiment. This unique structure will be discussed later.

The ultrasonic diagnostic apparatus body 10 is provided with an ultrasonic transmission unit 11, an ultrasonic reception unit 12, a B-mode processing unit 13, a Doppler processing unit 14, a scan converter 15, an image synthesis unit 16, a monitor 17, a storage unit 18, a control unit 19, and an input unit 20. Functions of individual constituent elements will be explained hereinafter.

The ultrasonic transmission unit 11 has a rate pulse generation circuit, a delay circuit, a drive pulse generation circuit, etc. which are not illustrated. The rate pulse generation circuit repeatedly generates rate pulses at a predetermined rate frequency fr Hz (cycle: 1/fr-sec). The delay circuit gives delay time to each rate pulse necessary to focus ultrasonic waves in a form of beams for each channel as well as to determine transmission directional characteristics. The drive pulse generation circuit generates ultrasonic drive pulses at a timing based on each delayed rate pulse. A plurality of piezoelectric transducers of the ultrasonic probe 5 which have received ultrasonic drive pulses generate ultrasonic waves.

The ultrasonic reception unit 12 has an amplifier circuit, an analog-to-digital converter, an adder, etc. which are not illustrated. The amplifier circuit amplifies echo signals for each channel. The analog-to-digital converter converts the amplified echo signals from analog signals to digital signals by sampling and quantization. The delay circuit gives each echo signal converted into a digital signal the delay time necessary to focus echo signals in a form of beams and to successively change the reception directional characteristics. The adder adds echo signals to which the delay time is given. The echo signals which have undergone addition-processing are supplied to the B-mode processing unit 13 and the Doppler processing unit 14.

The B-mode processing unit 13 logarithmically amplifies the echo signals supplied from the ultrasonic reception unit 12. Then the B-mode processing unit 13 performs the envelope detection on the logarithmically amplified echo signals. By the envelope detection, the B-mode processing unit 13 generates brightness data in which the echo signal intensity is expressed by brightness. The B-mode processing unit 13 supplies this brightness data to the scan converter 15. The brightness data supplied is displayed on the monitor 17 as a B-mode image.

The Doppler processing unit 14 computes Doppler signals of blood current, etc. derived from Doppler effects by frequency-analyzing the echo signals supplied from the ultrasonic reception unit 12. The Doppler processing unit 14 computes data such as average speed of blood current, etc., speed dispersion, blood information represented by power of Doppler signals, etc., at a large number of points on the basis of the Doppler signals of blood current, etc. The Doppler processing unit 14 transmits the computed blood information and other data to the scan converter 15. The blood current information and other data transmitted are displayed on the monitor 17 as average speed images, dispersion images, power images or combined images of those.

The scan converter 15 converts ultrasonic scan line signal columns of the received brightness data, blood information data, and other data into scan line signal columns of general video formats used to TV, generates video signals, and transmits the signals to the image synthesis unit 16.

The image synthesis unit 16 receives video signals from the scan converter 15 and the storage unit 18, synthesizes the video signals with character information and scales, etc. of various parameters and outputs them to the monitor 17.

The monitor 17 displays morphological information within the living body and blood information as images on the basis of the video signals from the image synthesis unit 16.

The storage unit 18 stores control programs for implementing image generation and display processing, various kinds of image data, etc.

The system control unit 19 controls each constituent element to realize operation as the ultrasonic diagnostic apparatus body 10.

The input unit 20 has various kinds of switches, buttons, a track ball, a mouse, a keyboard, and others to import instructions from an operator into the ultrasonic diagnostic apparatus body 10.

Figure 2:
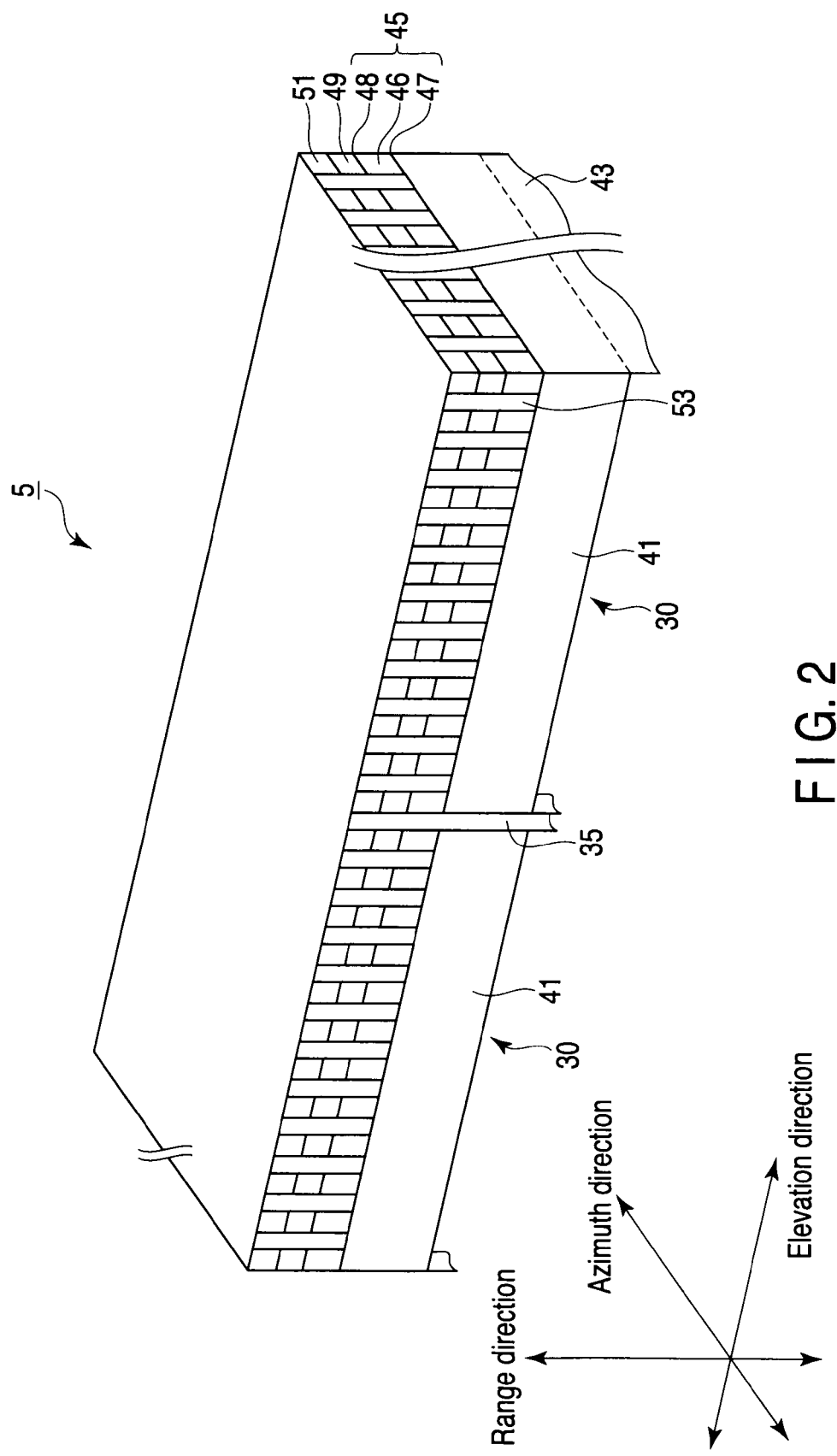
FIG. 2 is a perspective view briefly showing the structure of an ultrasonic probe of FIG. 1.

Now, discussion will be made on the structure unique to the ultrasonic probe 5 according to the present embodiment. FIG. 2 is a perspective view showing the configuration of the ultrasonic probe 5. As shown in FIG. 2, the ultrasonic probe 5 has two modules 30 connected along the elevation (side surface) direction. The adjacent modules 30 are joined by, for example, silicone, etc. Note that, "two modules" is one example, and three, four, or more modules 30 may be joined. Now, let the azimuth direction be the electronic scanning direction of the ultrasonic probe 5, the elevation direction the direction perpendicular to the electronic scanning surface, and the range direction the direction perpendicular to the azimuth direction and the elevation direction.

The module 30 has a backing material 41 as a sound absorbing material. The backing material 41 is formed in a rectangular block shape. At the upper side of the backing material 41, a plurality of piezoelectric transducers 45 are joined via a flexible PC board (FPC) 43.

The plurality of piezoelectric transducers 45 are arranged with predetermined intervals provided in the elevation direction and in the azimuth direction. In this way, the plurality of piezoelectric transducers 45 form a two-dimensional array structure. For example, a total of 480 pieces of piezoelectric transducers 45 are arranged, with 12 columns along the elevation direction and 40 columns along the azimuth direction. Needless to say, the piezoelectric transducers 45 of the quantity other than this may be arranged.

Each piezoelectric transducer 45 has a piezoelectric element 46, a signal electrode 47 formed at the lower side of the piezoelectric element 46, and an earth electrode 48 formed at the upper side of the piezoelectric element 46. The detail on the arrangement of the piezoelectric transducer 45 will be described later.

The piezoelectric element 46 is formed of two-component system or three-component system piezoelectric ceramics or piezoelectric monocrystal.

The signal electrode 47 is formed of copper foil or other metal foils. A plurality of signal electrodes 47 are electrically connected to a plurality of wirings disposed on the FPC 43, one by one. This connection relation can apply drive signals to the plurality of piezoelectric transducers 45 separately.

The FPC 43 is disposed between the backing material 41 and the piezoelectric transducer 45 as described above. The FPC 43 is configured of a plurality of wirings for supplying electric power to a plurality of signal electrodes 47, a flexible substrate, and others. The signal electrode 47 and wiring are electrically connected. Via this wiring, a predetermined voltage is applied to the signal electrode 47 from the ultrasonic transmission unit 11. The FPC 43 is bent substantially 90 degrees along both side surfaces concerning the elevation direction of the backing material 41.

The earth electrode 48 is formed of copper foil or other metal foils. The earth electrode 48 is taken out by a earth lead-out electrode (not illustrated) connected to both side surfaces along the elevation direction of the ultrasonic probe 5. The earth lead-out electrode is an electrode to connect the earth electrode 48 to the ground. Though not illustrated, the earth lead-out electrode is connected to the FPC 43 in both side surfaces of the ultrasonic probe 5 and integrated into one.

At the upper side of each piezoelectric transducer 45, a first acoustic matching layer 49 is disposed via the earth electrode 48. The first acoustic matching layer 49 is formed of a conductive material. The upper side of the first acoustic matching layer 49 is joined to a second acoustic matching layer 51. The second acoustic matching layer 51 is formed of an insulating material. The first acoustic matching layer 49 and the second acoustic matching layer 51 are disposed to change the acoustic impedance stepwise from the piezoelectric transducer 45 to a patient. The upper side of the second acoustic matching layer 51 has an acoustic lens (not illustrated) disposed so as to cover all the upper side of the second acoustic matching layer 51. Note that, the ultrasonic probe 5 according to the present embodiment has a configuration to have the first acoustic matching layer 49 and the second acoustic matching layer 51, but may have a configuration to have the first acoustic matching layer 49 only.

The piezoelectric transducer 45, the first acoustic matching layer 49, and the second acoustic matching layer 51 are divided by a clearance 53 along the elevation direction and azimuth direction. In each clearance 53, typically, resin material such as epoxy resin, or packing material with a filler material mixed in resin material such as epoxy resin is packed.

Figure 3:
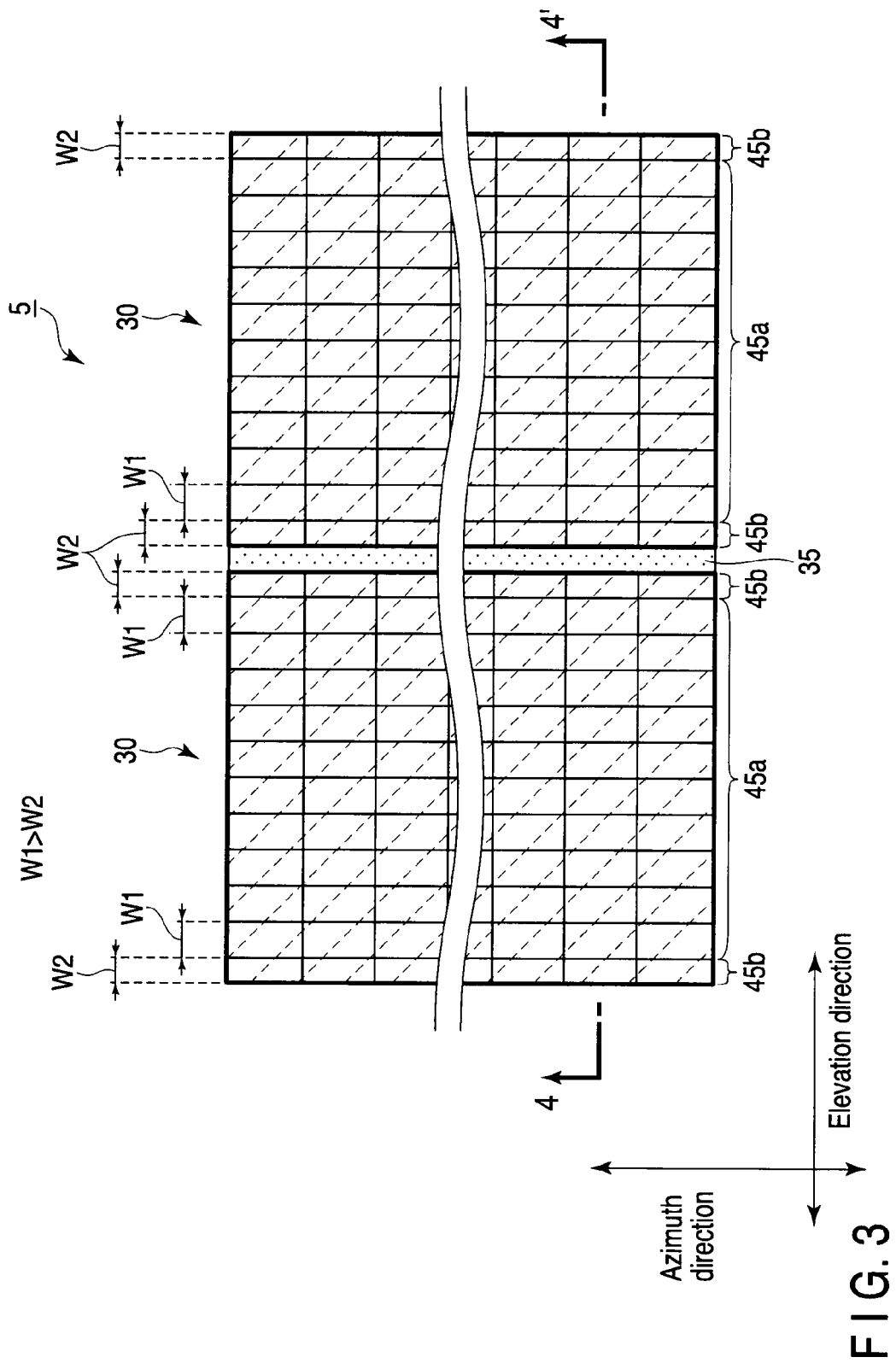
FIG. 3 is a plan view briefly showing the structure of the ultrasonic probe of FIG. 2.

FIG. 3 is a simplified plan view of the ultrasonic probe 5 of FIG. 2. As shown in FIG. 3, two modules 30 (thick frames of FIG. 3) are connected via an adhesive layer 35 formed of silicone. To one module 30, a total of 480 pieces of piezoelectric transducers 45, with 12 columns along the elevation direction and 40 columns along the azimuth direction, are arranged. The piezoelectric transducer 45 is divided into a first piezoelectric transducer 45a and a second piezoelectric transducer 45b in accordance with the width related to the elevation direction. The first piezoelectric transducer 45a has the width W1 along the elevation direction. The first piezoelectric transducer 45a is disposed in the inside along the elevation direction of the module 30. In FIG. 3, 10 pieces each of the first piezoelectric transducers 45a are disposed along the elevation direction. The second piezoelectric transducer 45b has the width W2 along the elevation direction. The second piezoelectric transducer 45b is disposed at the edge along the elevation direction of the module 30. In order to achieve reduction of side lobe increase, the width W1 is designed to be larger than the width W2.

To see the module 30 not independently but as a whole ultrasonic probe 5, to the ultrasonic probe 5, a total of 960 pieces of piezoelectric transducers 45 are disposed, with 24 columns in the elevation direction and 40 columns in the azimuth direction. On both edges of the ultrasonic probes 5 along the elevation direction, the second piezoelectric transducers 45b are disposed. Furthermore, at the boundary portion of adjacent modules 30 along the elevation direction, second piezoelectric transducers 45b are disposed. In the remainder portion, the first piezoelectric transducers 45a are disposed.

Figure 4:
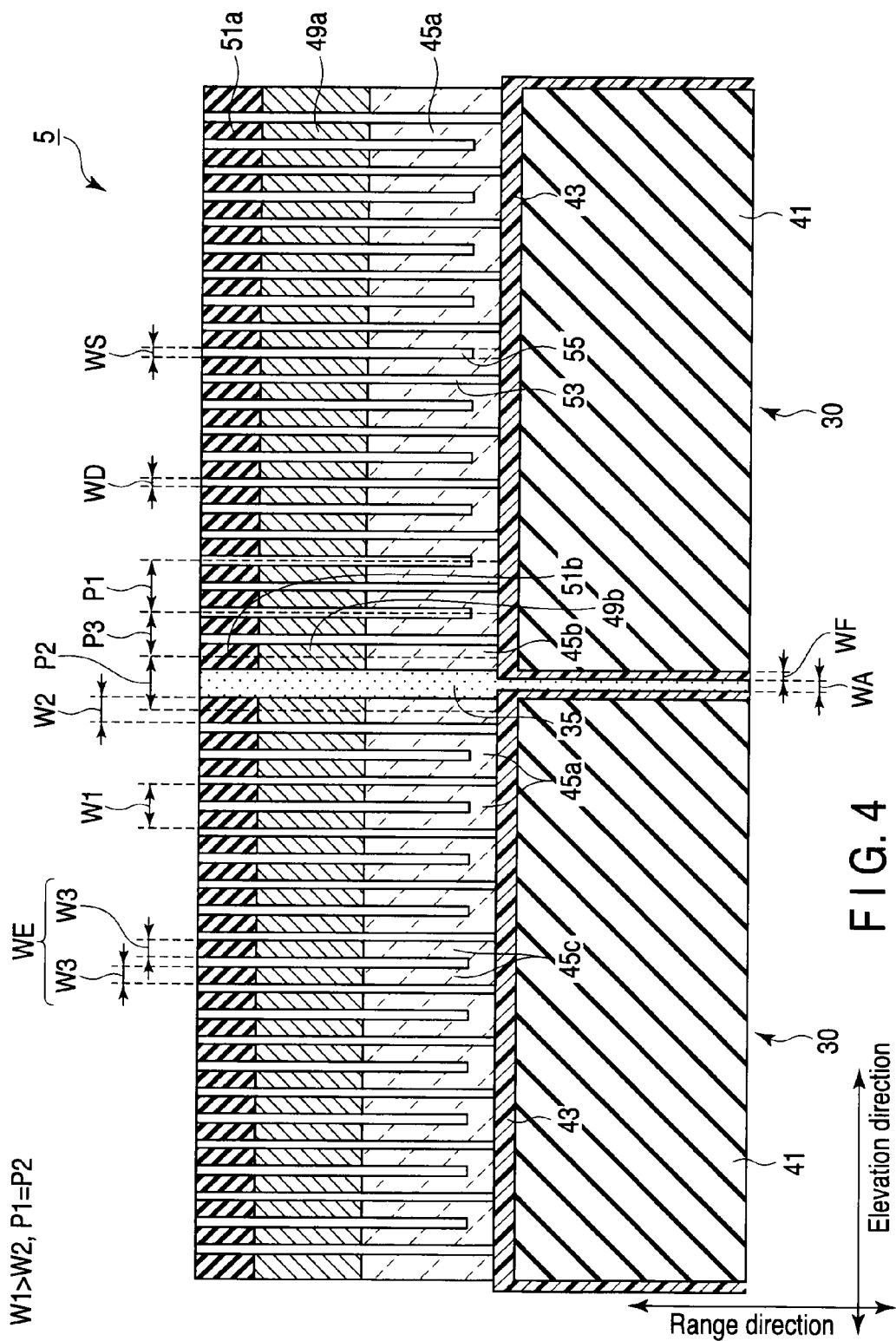
FIG. 4 is a cross-sectional view taken on line 4-4' of FIG. 3.

FIG. 4 is a cross-sectional view taken on line 4-4' of FIG. 3. As shown in FIG. 4, the module 30 has a backing material 41. The upper side of the backing material 41 is joined to a plurality of piezoelectric transducers 45 via the FPC 43 which has a thickness WF. The thickness WF is typically 50 μm. The FPC 43 is bent substantially 90 degrees at both side surfaces of the backing material 41. The module 30 is joined in the elevation direction by silicone adhesives, etc. To explain more in detail, the module 30 is joined in such a manner that the second piezoelectric transducer 45b faces the second piezoelectric transducer 45b of the adjoining module 30 with the adhesive layer 35 therebetween. The thickness WA of the adhesive layer 35 by silicone (distance between two FPCs 43 pasted together) is typically 50 μm.

As shown in FIG. 4, dicing grooves 53 are disposed between adjacent first piezoelectric transducers 45a, between adjacent second piezoelectric transducers 45b, and between adjacent first piezoelectric transducer 45a and second piezoelectric transducer 45b. The dicing groove 53 has the width WD along the elevation direction. This width DS is determined in accordance with the thickness of a dicing blade. Typically, the width DS is 50 μm.

The width W1 of the first piezoelectric transducer 45a along the elevation direction is designed to be typically 250 μm. The first piezoelectric transducer 45a has a sub-dicing groove 55 formed by being sub-diced by a dicing blade. The sub-dicing groove 55 has the width WS along the elevation direction. The width WS is determined in accordance with the thickness of the dicing blade. Typically, the width WS is equal to the width WD and is 50 μm. Now, assume that each portion of the first piezoelectric transducer 45a cut into two by sub-dicing is called a first piezoelectric transducer piece 45c. The first piezoelectric transducer piece 45 has width W3 along the elevation direction. The width W3 is 100 μm. Consequently, effective width WE (WE=2×W3=W1−WS) of the first piezoelectric transducer 45b is 200 μm. In addition, the center-to-center distance (pitch between first piezoelectric transducers) p1 of adjacent two first piezoelectric transducers 45a is 300 μm.

As shown in FIG. 4, the second piezoelectric transducer 45b disposed at the edge part of the module 30 is not subdiced for reinforcing the mechanical strength. Width W2 is determined in such a manner that the center-to-center distance (pitch between second piezoelectric transducers) p2 of the two second piezoelectric transducers 45b joined is equal to the pitch p1 between the first piezoelectric transducers. That is, the width W2 is 150 μm. In addition, the distance between the center of the first piezoelectric transducer and the center of the second piezoelectric transducer (pitch between the first and second piezoelectric transducers) p3 is 250 μm.

The effects of the ultrasonic probe 5 which has the configuration described above will be explained as follows.

Figure 8:
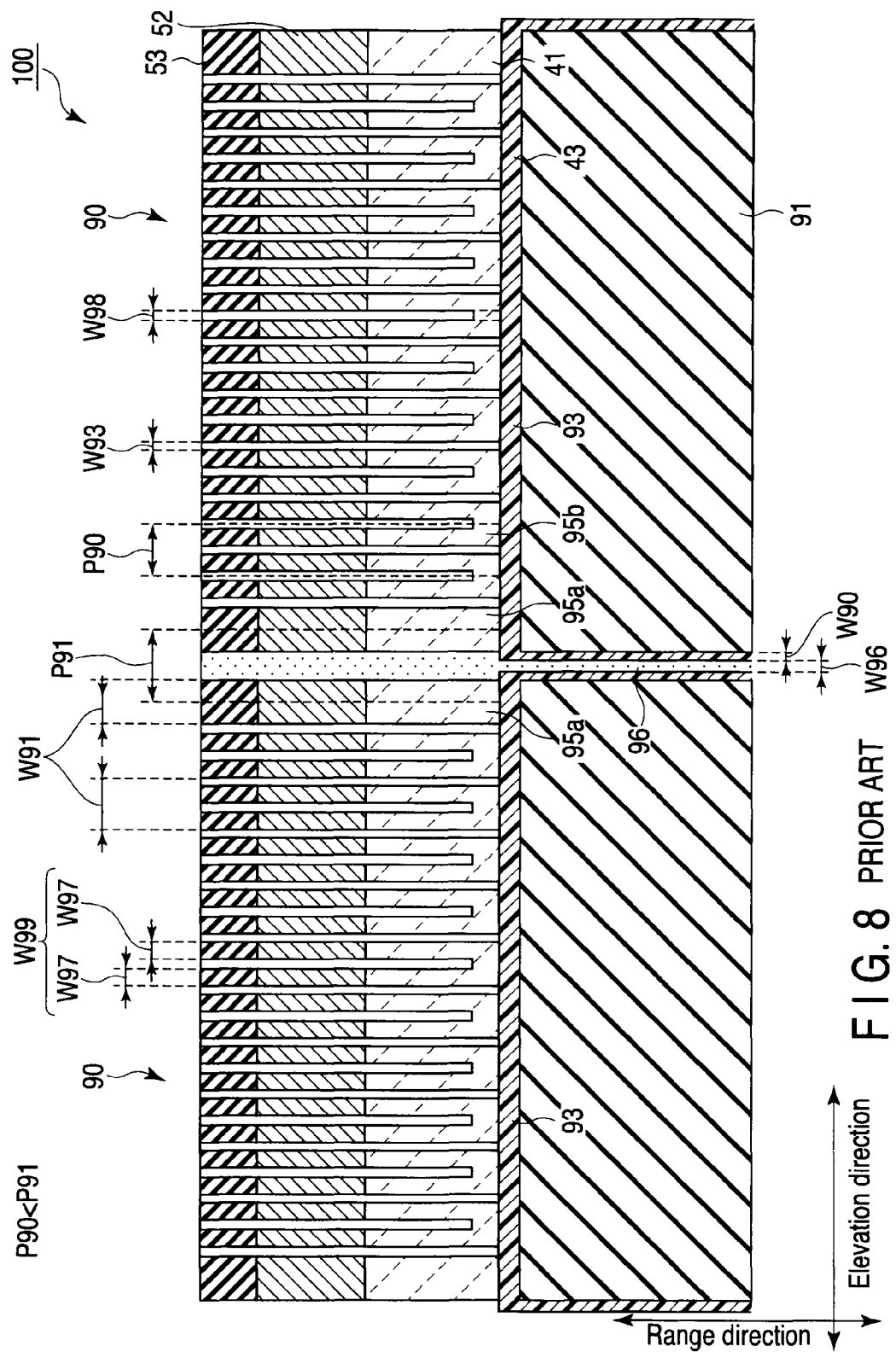
FIG. 8 is a transverse cross-sectional view of a conventional type ultrasonic probe.

(1) According to the configuration of a conventional type ultrasonic probe 100 shown in FIG. 8, the center-to-center distance p91 of two piezoelectric transducers 95a which are adjacent to each other via an adhesive layer is larger than the center-to-center distance p90 of two piezoelectric transducers 95b which are adjacent to each other inside the module. On the other hand, according to the configuration of the ultrasonic probe 5 according to the present embodiment shown in FIG. 4, the width W2 of the piezoelectric transducer 45b at the end part of the module 30 is narrower than the width W1 of the first piezoelectric transducer 45a in the inside of the module 30. Consequently, it is possible to make the pitch p2 between the second piezoelectric transducers substantially equal to the pitch p1 between the first piezoelectric transducers. As a result, the ultrasonic probe 5 has the side lobe increase reduced as compared to the conventional type ultrasonic probe 100.

(2) In the case of being sub-diced, according to the configuration of the conventional ultrasonic probe 100 shown in FIG. 8, the width W91 of the piezoelectric transducer 95a at the module end part is 250 μm and the effective width W99 of the piezoelectric transducer 95b inside the module is 200 μm. Consequently, when the same drive voltage is applied to the piezoelectric transducer 95a and the piezoelectric transducer 95b, the intensity of the ultrasonic wave generated from the piezoelectric transducer 95a is about 2 dB higher than the intensity of the ultrasonic wave generated from the piezoelectric transducer 95b. On the other hand, according to the configuration of the ultrasonic probe 5 according to the present embodiment shown in FIG. 4, making the width W2 of the second piezoelectric transducer 45b narrower than the width W1 of the first piezoelectric transducer 45a narrows the width W2 of the second piezoelectric transducer 45b from the effective width WE of the first piezoelectric transducer 45a. In the example of FIG. 4, the width W3 is 150 μm and the width WE is 200 μm, and therefore, when the same drive voltage is applied to the piezoelectric transducer 45a and the piezoelectric transducer 45b, the intensity of the ultrasonic wave generated from the second piezoelectric transducer 45b is about 2 dB smaller than the intensity of ultrasonic wave generated from the first piezoelectric transducer 45a as shown in FIG. 5. As a result, the acoustic field of the ultrasonic wave generated from the ultrasonic probe 5 is not inverse-weighting. That is, the side lobe increase is reduced as compared to the conventional ultrasonic probe 100.

Figure 6:
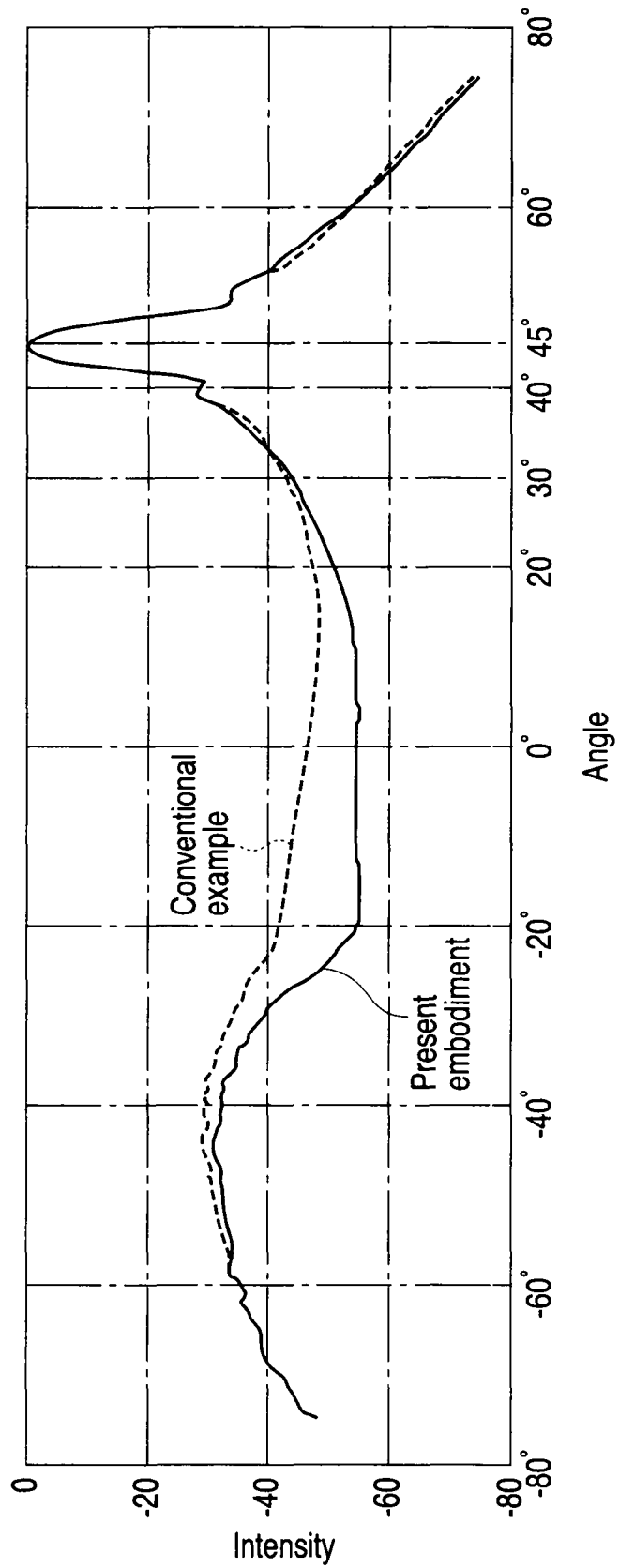
FIG. 6 is a diagram showing difference in ultrasonic characteristics between the ultrasonic probe in the embodiment and a conventional ultrasonic probe.

Referring now to simulation results shown in FIG. 6, characteristics of the ultrasonic wave generated from the ultrasonic probe 5 are discussed. FIG. 6 shows the relationship between the acoustic field intensity of the ultrasonic wave and the angle of the ultrasonic beam when the same drive voltage is applied to 3-MHz driven piezoelectric transducers and the ultrasonic beam is deviated by 45 degrees relative to the center axis. The solid line shows the data by the ultrasonic probe 5 in the present embodiment and the broken line shows the data by the conventional ultrasonic probe 100 of FIG. 8. In both data, the acoustic field intensity at 45 degrees is set to zero. As shown in FIG. 6, the ultrasonic probe 5 in the present embodiment has side lobes reduced in a wide range from −40 degrees to +30 degrees as compared to the conventional ultrasonic probe 100.

Figure 7:
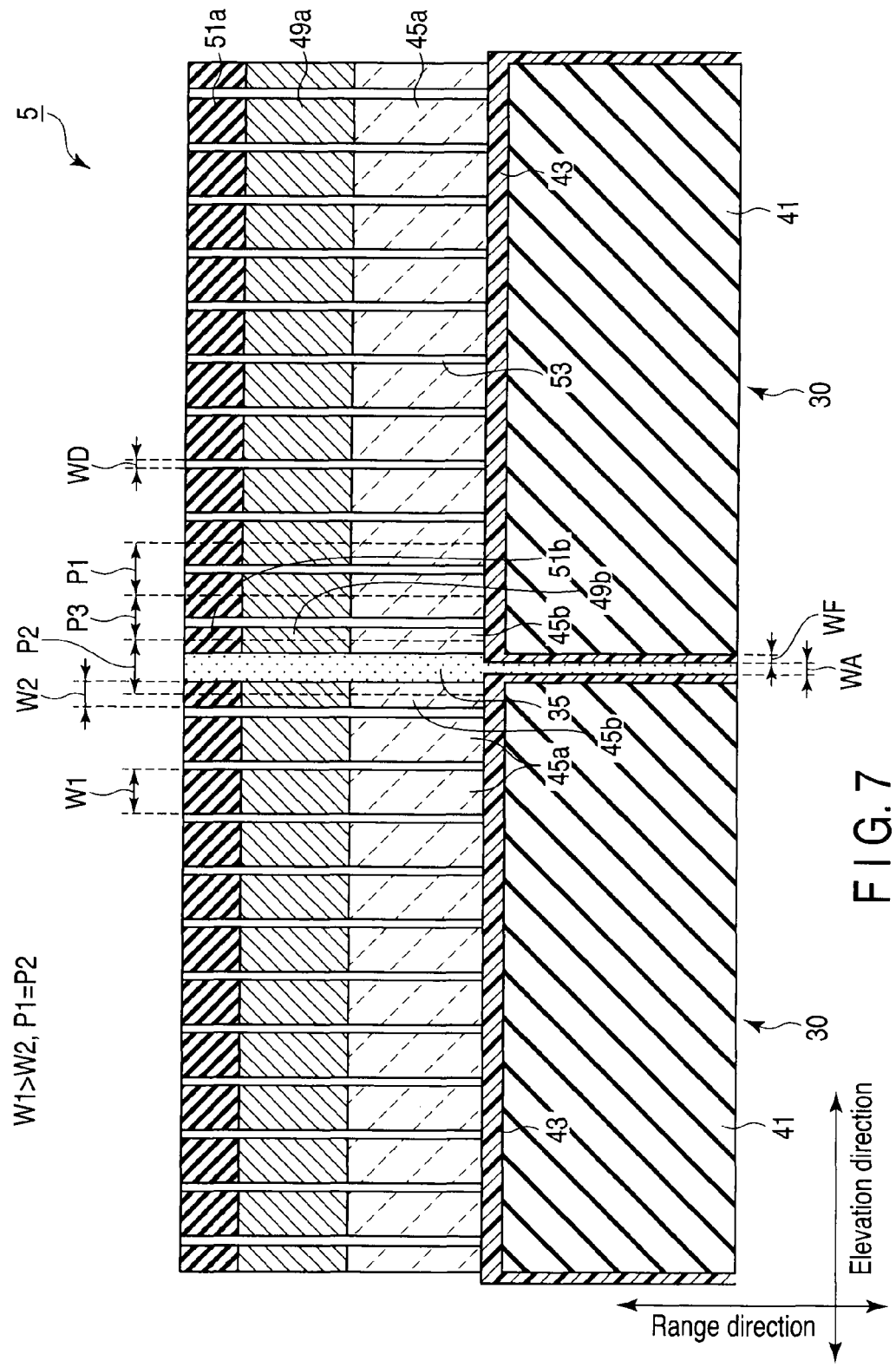
FIG. 7 is a transverse cross-sectional view of an ultrasonic probe according to the embodiment, which is not sub-diced.

Note that, in the above-mentioned configuration, it is assumed that the first piezoelectric vibrator 45a is sub-diced. However, the first piezoelectric vibrator 45a may not always be sub-diced. FIG. 7 shows a transverse cross-sectional view of an ultrasonic probe which is not sub-diced. As shown in FIG. 7, since the effective width W1 of the first piezoelectric transducer 45a is 250 μm, the intensity of the ultrasonic wave generated from the second piezoelectric transducer 45b is 4 dB lower than the intensity of the ultrasonic wave generated from the first piezoelectric transducer 45a. Consequently, the acoustic field does not become inverse-weighting and as a result, as compared to the non-sub-diced conventional ultrasonic probe, the ultrasonic probe shown in FIG. 7 has the side-lobe increase reduced.

In addition, in the above-mentioned configuration, the elevation direction only is considered for the pasting direction of the module 30. However, the module 30 can be joined not only in the elevation direction but also in the azimuth direction. That is, the module 30 can be joined in the two-dimensional manner. In such event, the azimuth-direction center-to-center distance of the two piezoelectric transducers connected in the azimuth direction is made equal to the azimuth-direction center-to-center distance of the piezoelectric transducers inside the module in the azimuth direction. For this purpose, the width concerning the azimuth direction of the piezoelectric transducers connected in the azimuth direction is made narrower than the width concerning the azimuth direction of the piezoelectric transducers inside the module.

In addition, in the above-mentioned configuration, piezoelectric transducers are arranged in the two-dimensional manner. However, the invention shall not be limited to this, but piezoelectric transducers may be arranged in the one-dimensional manner along the elevation direction or the azimuth direction.

Furthermore, in the above-mentioned configuration, the place where the second piezoelectric transducer 45b having the width W3 is disposed is both ends of the module 30. However, to the portion which is the end of the module 30 and which is not joined to the adjacent module 30, the first piezoelectric transducer 45a having the width W1 may be disposed.

In this way, according to the present embodiment, reduction of side lobe increase is enabled in the ultrasonic probe 5 with a plurality of modules 30 and the ultrasonic diagnostic apparatus 1. In addition, the ultrasonic diagnostic apparatus 1 having the ultrasonic probe 5 can provide highly accurate ultrasonic images such as B-mode images, Doppler images, etc.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An ultrasonic probe, comprising:
   a plurality of modules joined at least in a first direction, wherein each of said modules includes
   a backing material;
   a plurality of first transducers arranged on an upper side of the backing material and having a first width with respect to the first direction; and
   at least one second transducer arranged on an upper side of the backing material and having a second width narrower than the first width with respect to the first direction, and arranged at both ends or one end of the modules with respect to the first direction.

2. The ultrasonic probe according to claim 1, wherein each of said modules has a second transducer joined to a second transducer of an adjacent module in such a manner that they face each other.

3. The ultrasonic probe according to claim 2, wherein a center-to-center distance of two second transducers joined in the first direction is substantially equal to a center-to-center distance of two adjacent first transducers along the first direction.

4. The ultrasonic probe according to claim 1, wherein said first transducers are arranged not only along the first direction, but also along a second direction that intersects with the first direction.

5. The ultrasonic probe according to claim 1, wherein said modules are joined not only along the first direction, but also along a second direction that intersects with the first direction.

6. The ultrasonic probe according to claim 1, wherein each of the first transducers has a groove.

7. An ultrasonic diagnostic apparatus, comprising:
   an ultrasonic probe having a plurality of modules joined at least in a first direction, wherein each of said modules includes
   a backing material;
   a plurality of first transducers arranged on an upper side of the backing material and having a first width with respect to the first direction; and
   at least one second transducer arranged on an upper side of the backing material and having a second width narrower than the first width with respect to the first direction, and arranged at both ends or one end of the modules with respect to the first direction.

\* \* \* \* \*